Dec. 20, 1932.   P. J. MARTELL ET AL   1,891,825
GAS SPEED TOASTER
Filed April 2, 1931   2 Sheets-Sheet 1

Philip J. Martell and
Wallace B. McMurray
INVENTORS

BY Victor J. Evans
and Co.
ATTORNEYS

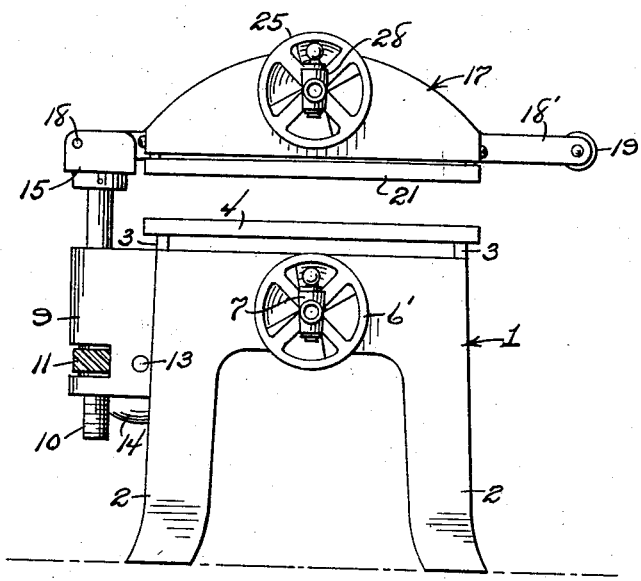
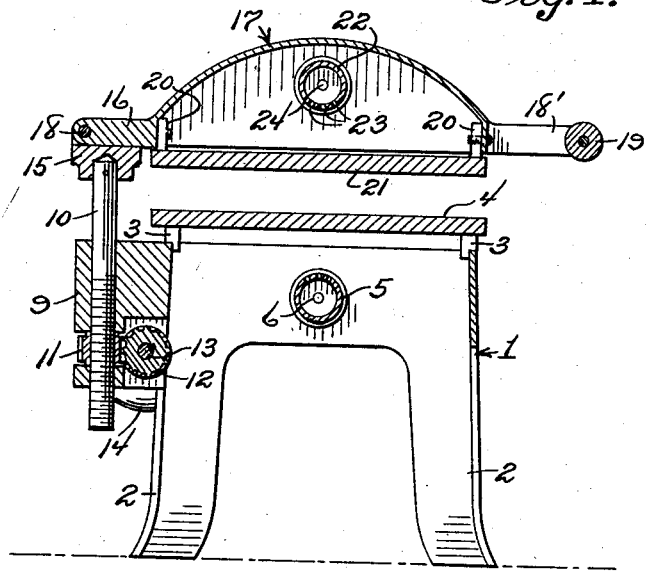

Patented Dec. 20, 1932

1,891,825

UNITED STATES PATENT OFFICE

PHILIP J. MARTELL AND WALLACE B. McMURRAY, OF MARYVILLE, TENNESSEE

GAS SPEED TOASTER

Application filed April 2, 1931. Serial No. 527,302.

Our present invention has reference to bread or sandwich toasting device and our primary object is the provision of a toaster of such construction that the heat from burners will be directed against oppositely disposed grid plates which are of a heat absorbing and retaining nature and which receive therebetween the bread or sandwich to be toasted, and wherein the toasting operation is greatly expedited with respect to the time required by the ordinary toaster.

A further object is the provision of a gas heated toaster that comprises two sections which are designed to receive the bread therebetween and to direct heat against the opposite sides of the bread to expedite the toasting thereof and wherein the upper section is vertically adjustable with respect to the lower section, and likewise swingable to an outward angle with respect to the lower section so that the heat absorbing and emitting plate on the lower section may be employed for cooking griddle cakes or for purposes other than the toasting of bread or sandwiches.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claim.

In the drawings:

Figure 3 is an end view thereof.

Figure 4 is a sectional view approximately on the line 4—4 of Figure 1.

Figure 1:
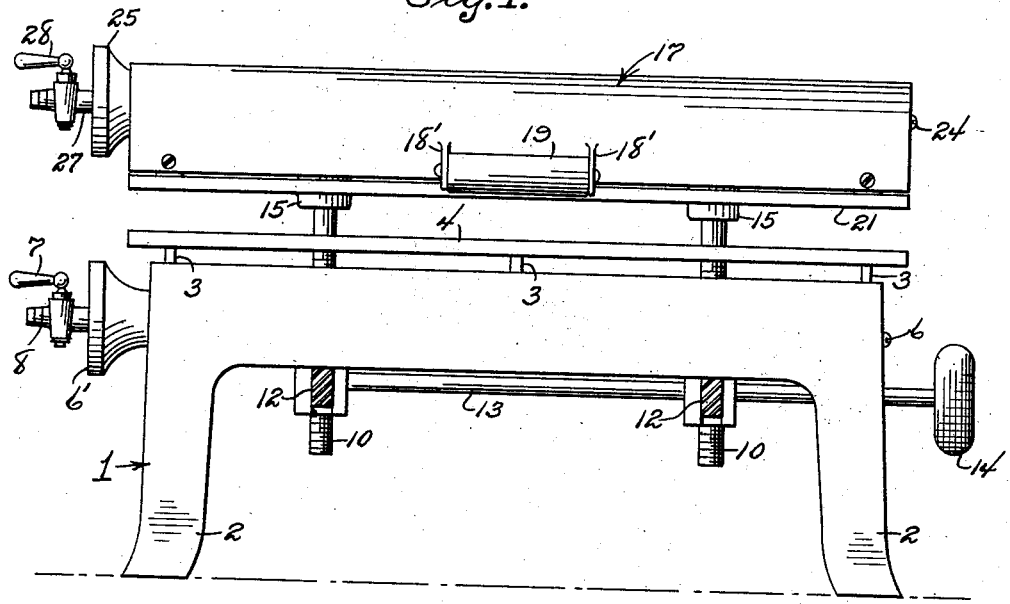
Figure 1 is a side elevation of the improvement.
Figure 2:
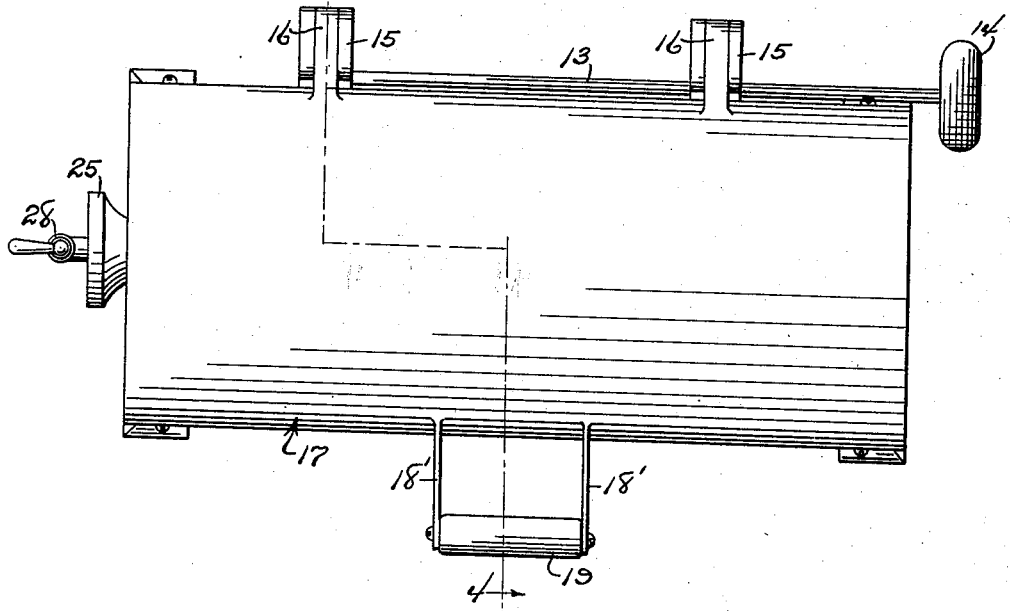
Figure 2 is a top plan view thereof.

The lower section 1 of our improvement is in the nature of an ordinary gas stove which is small in size and which is supported on legs 2. The top of the section 1 is open and the said top is engaged by the notched corners of lugs 3 that depend from a heat absorbing and emitting plate 4. The plate is of a size approximately equalling that of the stove proper.

Extending through one end of the stove 1 there is a tubular gas burner 5. One end of the burner is closed and is supported on one end of the stove 1 by a bolt or like element 6. The other element has attached thereto an air inlet regulator 6 of the usual construction, and through which extends the gas conducting pipe which is regulated by the usual hand operated valve 7. The outer end of the gas conducting pipe 8 may be connected directly to the gas supply or may have a flexible gas conductor pipe attached thereto.

On the back side of the stove 1 there is formed a pair of spaced blocklike lugs 9 whose upper wall is in a line with the top of the stove proper. Each block or lug has a vertical opening therethrough for the passage of a screw member 10. Each screw member is engaged by a nut 11 received in a notched or cut-away portion of the blocks. The outer periphery of each nut is formed with worm threads to be engaged by a worm wheel 12 whose shaft 13 is journaled through a suitable bearing opening in the blocks 9.

The shaft has on one of its ends an operating handle 14 positioned adjacent one of the ends of the stove 1.

The screws 10 have their upper ends nonthreaded and are received and fixed in the sockets of the head members 15. Each head 15 is grooved or bifurcated longitudinally from the upper face thereof to receive therein ears 16 that project from the inner face of the upper stove member 17. The ears 16 are pivoted, as at 18, in the respective heads 15.

The members 17, which we have termed the upper stoves are really in the nature of heat directing shields, the upper or top walls of which being arched transversely and the depending outer flange thereof having centrally secured thereto outstanding arms 18 between which is pivotally supported a handle 19. The shield has removably secured thereto lugs 20 which extend upwardly from a plate 21 of heat absorbing and emitting material. Preferably the plates 4 and 21 are of aluminum but obviously other metal or material may be employed. The heating plate 21 is arranged a slight but suitable distance below the shield 17 to afford an outlet for any odors arising from the gas heater in the said shield. The heater comprises a burner tube 22 that has its lower face provided with apertures 23, its rear wall closed or attached to the shield by a bolt or like element 24. The second end of the burner tube 25 projects through one end of the shield 17 and is provided with an air regulator 25 of the usual construction, and through which regulator there is passed the gas conducting pipe 27 whose passage is controlled by a hand operated valve 28. The pipe 27 has connected thereto a flexible gas conducting pipe attached to a suitable source of gas supply or other gas conducting pipe that is connected to the pipe 8. As the means for conducting the gas into either of the burners 5 and 22 is conventional we have not deemed it necessary to illustrate the same in the drawings but it is necessary that the conductor pipe attached to the burner pipe 27 be of a flexible nature. By turning the hand wheel 14 the plate 21 may be adjusted with respect to the plate 4 so that the plates are properly positioned to receive therebetween slices of bread or sandwiches to be toasted. The plate 21 with the shield may be swung to one side of the plate 4, so that the plate 4 may, when heated, be employed for cooking griddle cakes or other foodstuffs and may likewise be employed for toasting bread or sandwiches when only one of the sides thereof are to be toasted.

Having described the invention, we claim:

In a device for the purpose set forth, a hollow substantially rectangular frame having a heating element therein and a plate thereon to absorb heat from the heating unit and having one of its sides, adjacent its ends, provided with block-like lugs, a shield arranged above the frame carrying a plate and having means for heating the plate and said shield having one of its sides, adjacent its end, formed with outwardly extending lugs, screws passing freely through the blocks of the plate and having upper heads that afford rests for the lugs of the shield and to which heads the lugs are pivoted, worm nuts housed in the lugs and engaging the screws, worm wheels meshing with the worm nuts, and an operating shaft connected to the worm wheels.

In testimony whereof we affix our signatures.

PHILIP J. MARTELL.
WALLACE B. McMURRAY.